(No Model.)
J. H. MILLER.
VEHICLE RUNNING GEAR.
No. 343,248. Patented June 8, 1886.
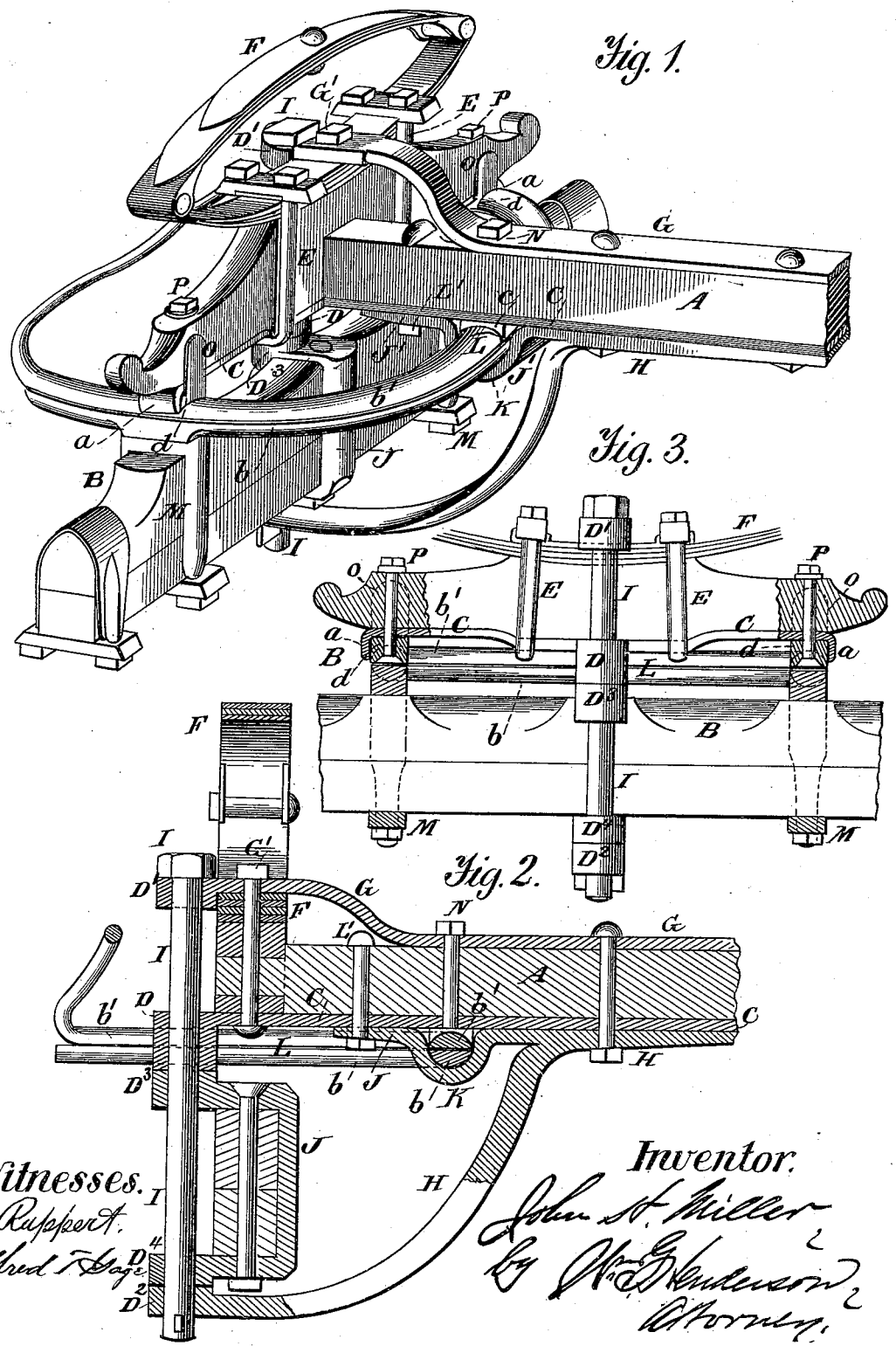

UNITED STATES PATENT OFFICE.

JOHN HENRY MILLER, OF JEFFERSON COUNTY, ILLINOIS, ASSIGNOR OF ONE-HALF TO JOHN F. McKELVEY AND THOMAS NEWTON MILBURN, BOTH OF SAME PLACE.

VEHICLE RUNNING-GEAR.

SPECIFICATION forming part of Letters Patent No. 343,248, dated June 8, 1886.

Application filed February 12, 1886. Serial No. 191,712. (No model.)

*To all whom it may concern:*

Be it known that I, JOHN HENRY MILLER, a citizen of the United States, residing in the county of Jefferson, and State of Illinois, with post-office address at Dix, in said county and State, have invented certain new and useful Improvements in Vehicle Running-Gear; and I do hereby declare the following to be a full, clear, and exact description of the invention, such as will enable others skilled in the art to which it appertains to make and use the same.

My invention relates to wheeled vehicles, particularly to the manner of connecting the bolster or head block, the reach, and the fifth-wheel, and has for its object to so construct and combine said parts that they will be greatly increased in strength and durability, and so that if the king-bolt become broken the axle and reach will remain connected together, and if it become worn it can be readily and easily replaced by another; and to such ends the invention consists in the construction and the combination hereinafter particularly described, and then sought to be pointed out in the claims.

In the accompanying drawings, Figure 1 is a perspective view embodying my invention; Fig. 2, a vertical longitudinal section through the same; Fig. 3, a front elevation with parts in section.

The letter A designates the reach connected to the axle B, and having secured to its lower side a brace-plate, C, which, at its forward end, is turned at right angles to its length in opposite directions, so as to lie against the under side of the axle, and has its ends turned downwardly to form hooks $a$. This piece, which lies under the axle, instead of being made in one piece with the plate C, may be made separate therefrom, and it has formed on its front edge, about midway of its length, where the king-bolt will pass, a socket or thimble, D, through which the bolt passes. The brace-plate is secured to the axle by clips E, which also secure the spring F to the axle.

A second brace-plate, G, is secured to the top of the reach, and at its forward end is bent or curved so as to extend over the portion of the spring F which lies upon the axle, and at its end forward of the axle is formed with a socket or thimble, D', through which the king-bolt will pass with its head resting thereon. This brace-plate may be secured to the axle by a bolt, G', passing through it, the axle, and first brace-plate, C.

A third brace-plate, H, is secured to the under side of brace-plate C, and is bent or curved downward at its forward portion, so as to extend beneath the axle and in front thereof, where its end is formed into a socket or thimble, $D^2$, in line with the thimbles D and D', through all of which the king-bolt passes. The bolt, which is designated by the letter I, also passes through the two sockets or thimbles $D^3$ and $D^4$, formed at the two ends of the clip J, which clasps the axle, the said thimbles being in front of the axle, one at the top and the other at the bottom of the axle and in line with the other thimbles for the passage of the bolt.

The king-bolt is thus provided with five bearing-points, and is braced at five points by the thimbles, so that the strain will be distributed, and the bolt thus rendered stronger and more durable. The bolt is also brought in front of the axle and head-block, thus taking wear and tear from off the head-block, so that as a consequence the buggy or wagon body will maintain its upright position longer than when the bolt passes through and wears the head-block. This construction also permits the bolt to be removed and replaced without disturbing the other parts, and has other advantages apparent and therefore not necessary to enumerate. It may be stated also that by passing the bolt through the thimbles to the clip around the axle a better leverage is obtained than otherwise.

The brace-plate H is formed with an arm or extension, J', forward of the point where it turns down to the axle, which extension is formed with a loop, K, for the fifth-wheel L to lie in, and has its end secured by a nutted bolt, L', passed through the reach. The lower leaf or plate, $b$, of the fifth-wheel lies in the loop K, so as to move therein, and its forward portion is secured to the axle by clips M. The top leaf, $b'$, lies also in the loop, and at that point is formed with a boss, $c$, and is rigidly held to its place by a bolt, N, passing through the reach. This lower leaf, at a point under the head-block, is formed with a boss, $d$, from which extend upwardly ears O, which fit on opposite sides of the head-block. The hooks $a$ of the brace-plate C fit down over these bosses, and bolts P, passed through the head-block, brace-plate, and upper leaf of the fifth-wheel, hold the said parts together. It will be noticed that by this construction the fifth-wheel is held securely to the reach, so that if the king-bolt should break the axle will be held to the reach and head-block by the fifth-wheel, so that there is no danger of the occupants of the vehicle being pitched forward out of it in the event of the bolt breaking.

The construction is such that the parts can be applied to vehicles already in use as well as to others in course of building, and the whole, besides possessing advantages already severally enumerated, is simple in its several parts, cheap of production, and efficient for the objects in view.

Having described my invention and set forth its merits, what I claim is—

1. The combination, with the reach and head-block and braces extending from the reach to a point in front of the head-block and formed at their ends with thimbles D' D, in line with each other, of a clip, J, having thimbles $D^3 D^4$ in front of the axle in line with the thimbles of the braces, substantially as described.

2. The combination of the axle having one leaf of a fifth-wheel secured thereto, the reach having a loop attached to it, through which said leaf passes, the upper leaf of the fifth-wheel passed through said loop and rigidly secured to the reach, the ears extending from the upper leaf to opposite sides of the head-block, and the brace to the under side of the head-block having hook ends bearing against the upper leaf of the fifth-wheel, substantially as described.

In testimony whereof I affix my signature in presence of two witnesses.

JOHN HENRY MILLER.

Witnesses:
ROBERT W. CARPENTER,
L. E. LEGGE.